(12) United States Patent
Huang (10) Patent No.: US 12,200,455 B2
(45) Date of Patent: Jan. 14, 2025

(54) AUDIO COMPENSATION METHOD AND RELATED PLAYBACK DEVICE

(71) Applicant: BENQ CORPORATION, Taipei (TW)

(72) Inventor: Chih-Pen Huang, New Taipei (TW)

(73) Assignee: BenQ Corporation, Taipei (TW)

( * ) Notice: Subject to any disclaimer, the term of this patent is extended or adjusted under 35 U.S.C. 154(b) by 249 days.

(21) Appl. No.: 17/983,362

(22) Filed: Nov. 8, 2022

(65) Prior Publication Data
US 2023/0292046 A1   Sep. 14, 2023

(30) Foreign Application Priority Data

Mar. 10, 2022   (TW) .................................. 111108709

(51) Int. Cl.
| | | |
|---|---|---|
| H04R 3/12 | (2006.01) | |
| G01S 7/4915 | (2020.01) | |
| G01S 17/32 | (2020.01) | |
| G06F 3/16 | (2006.01) | |
| H04R 1/02 | (2006.01) | |
| H04R 1/40 | (2006.01) | |
| H04R 29/00 | (2006.01) | |
| H04S 7/00 | (2006.01) | |

(52) U.S. Cl.
CPC .............. *H04R 3/12* (2013.01); *G01S 7/4915* (2013.01); *G01S 17/32* (2013.01); *G06F 3/165* (2013.01); *H04R 1/028* (2013.01); *H04R 1/403* (2013.01); *H04R 29/002* (2013.01); *H04S 7/301* (2013.01); *H04R 2499/15* (2013.01)

(58) Field of Classification Search
CPC .......... H04R 3/12; H04R 1/028; H04R 1/403; H04R 29/002; H04R 2499/15; G01S 7/4915; G01S 17/32; G06F 3/165; H04S 7/301
USPC .......................................................... 381/303
See application file for complete search history.

(56) References Cited

U.S. PATENT DOCUMENTS

2016/0381484 A1* 12/2016 Guo ........................ H04S 7/302
381/2

FOREIGN PATENT DOCUMENTS

| CN | 112333435 A | 2/2021 |
|---|---|---|
| CN | 113302692 A | 8/2021 |

* cited by examiner

*Primary Examiner* — Sean H Nguyen (57) ABSTRACT

An audio compensation method is applied to a playback device which includes a first distance detector, a second distance detector, an audio output module and an operation processor. The operation processor executes the audio compensation method to acquire a projection distance and a relative angle of the playback device relative to a projection screen via the first distance detector and the second distance detector, to acquire an installation parameter of the playback device, to search at least one audio output setting from an audio setting table in accordance with the projection distance and the relative angle and the installation parameter, and utilize the audio output setting to drive the audio output module.

16 Claims, 6 Drawing Sheets

AUDIO COMPENSATION METHOD AND RELATED PLAYBACK DEVICE

BACKGROUND OF THE INVENTION

1. Field of the Invention

The present invention relates to an audio compensation method and a playback device, and more particularly, to an audio compensation method and a playback device capable of executing automatic audio filed compensation.

2. Description of the Prior Art

With the advanced technology, the television is gradually replaced by the projector for the large scale viewing experience. The best position of the projector is set between the projection screen and the user, so that the user can have the preferred visual and audio experience. The lens of the projector can be set at the front side of the housing for projecting images, and the speaker of the projector can be set at the rear side of the housing for outputting the audio. Due to constraint of the installation environment, the projector may be placed beside the projection screen or the user; further, the speaker may be not placed right behind the housing. The user may feel time delay and unbalanced volume when listening to the two-channel audio from the speaker, which results in the worse visual and audio experience. Therefore, design of an audio compensation method and a related playback device of automatically calibrating the multi-channel audio field is an important issue in the entertainment equipment industry.

SUMMARY OF THE INVENTION

The present invention provides an audio compensation method and a playback device capable of executing automatic audio filed compensation for solving above drawbacks.

According to the claimed invention, an audio compensation method is applied to a playback device. The playback device has a first distance detector, a second distance detector, an audio output module and an operation processor. The audio compensation method includes utilizing the first distance detector and the second distance detector to acquire a projection distance and a relative angle of the playback device relative to a projection screen, acquiring an installed direction parameter of the playback device, searching at least one audio output setting from an audio setting table in accordance with the projection distance and the relative angle and the installed direction parameter, and utilizing the audio output setting to drive the audio output module.

According to the claimed invention, the audio output module includes a first audio player and a second audio player respectively disposed on different corners of the playback device. The audio compensation method further includes driving the first audio player and the second audio player to respectively output a related audio signal via different audio parameters in accordance with the audio output setting.

According to the claimed invention, utilizes the first distance detector and the second distance detector to acquire the projection distance and the relative angle of the playback device relative to the projection screen includes: the operation processor acquiring a first distance of the first distance detector relative to the projection screen, and a second distance of the second distance detector relative to the projection screen, the operation processor acquiring an interval between the first distance detector and the second distance detector, and the operation processor acquiring an interval between the first distance detector and the second distance detector; and According to the claimed invention, the playback device further includes an input interface. The audio compensation method further includes acquiring input information from the input interface, computing a receiving distance of the playback device relative to a predefined receivable range in accordance with the input information, the projection distance and the relative angle, and calibrating the audio output setting via the receiving distance and further utilizing the calibrated audio output setting to drive the audio output module. The input information is at least one of a distance and an angle of the predefined receivable range relative to the projection screen, and the at least one of the distance and the angle is manually input.

According to the claimed invention, the playback device further includes an object detector adapted to detect a relative distance and a relative angle of a target object located around the playback device. The audio compensation method includes acquiring the relative distance and the relative angle detected by the object detector, and calibrating the audio output setting via the relative distance and the relative angle and further utilizing the calibrated audio output setting to drive the audio output module.

According to the claimed invention, the playback device further includes a memory module adapted to store a plurality of audio setting tables. The audio compensation method includes searching the audio setting table relevant to the installed direction parameter from the plurality of audio setting tables, so as to acquire the corresponding audio output setting in the searched audio setting table.

According to the claimed invention, a playback device with an audio compensation function has an installed direction parameter and an audio setting table. The playback device includes a first distance detector, a second distance detector, an audio output module and an operation processor. The first distance detector is adapted to acquire a first distance of the playback device relative to a projection screen. The second distance detector is adapted to acquire a second distance of the playback device relative to the projection screen. The operation processor is electrically connected to the first distance detector, the second distance detector and the audio output module. The operation processor is adapted to analyze the first distance and the second distance to acquire a projection distance and a relative angle of the playback device relative to the projection screen, and search at least one corresponding audio output setting from the audio setting table in accordance with the installed direction parameter, the projection distance and the relative angle, so as to drive the audio output module by the audio output setting.

The audio compensation method and the playback device of the present invention can utilize the distance detector to acquire the relative distance and the degrees of the playback device relative to the projection screen, and to compute an arranged orientation of the playback device; if the predefined target object stands right before the projection screen, the arranged orientation of the playback device and the angle and distance parameters of the playback device relative to the projection screen can be analyzed to compute the setting parameters of the audio players of the audio output module, for an aim of the automatic audio field compensation. Moreover, the target object may freely move before the projection screen, so the present invention can further utilize the input interface or the object detector to acquire position of the target object, and immediately adjust the setting parameters of the audio players of the audio output module in accordance with the orientation data of the playback device relative to the projection screen and the target object; it is to say, if the target object moves before the projection screen, the audio compensation method and the playback device of the present invention can detect a moving track or current position of the target object to accordingly calibrate the output effects of the audio output module, so as to ensure the target object can have the preferred audio experience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
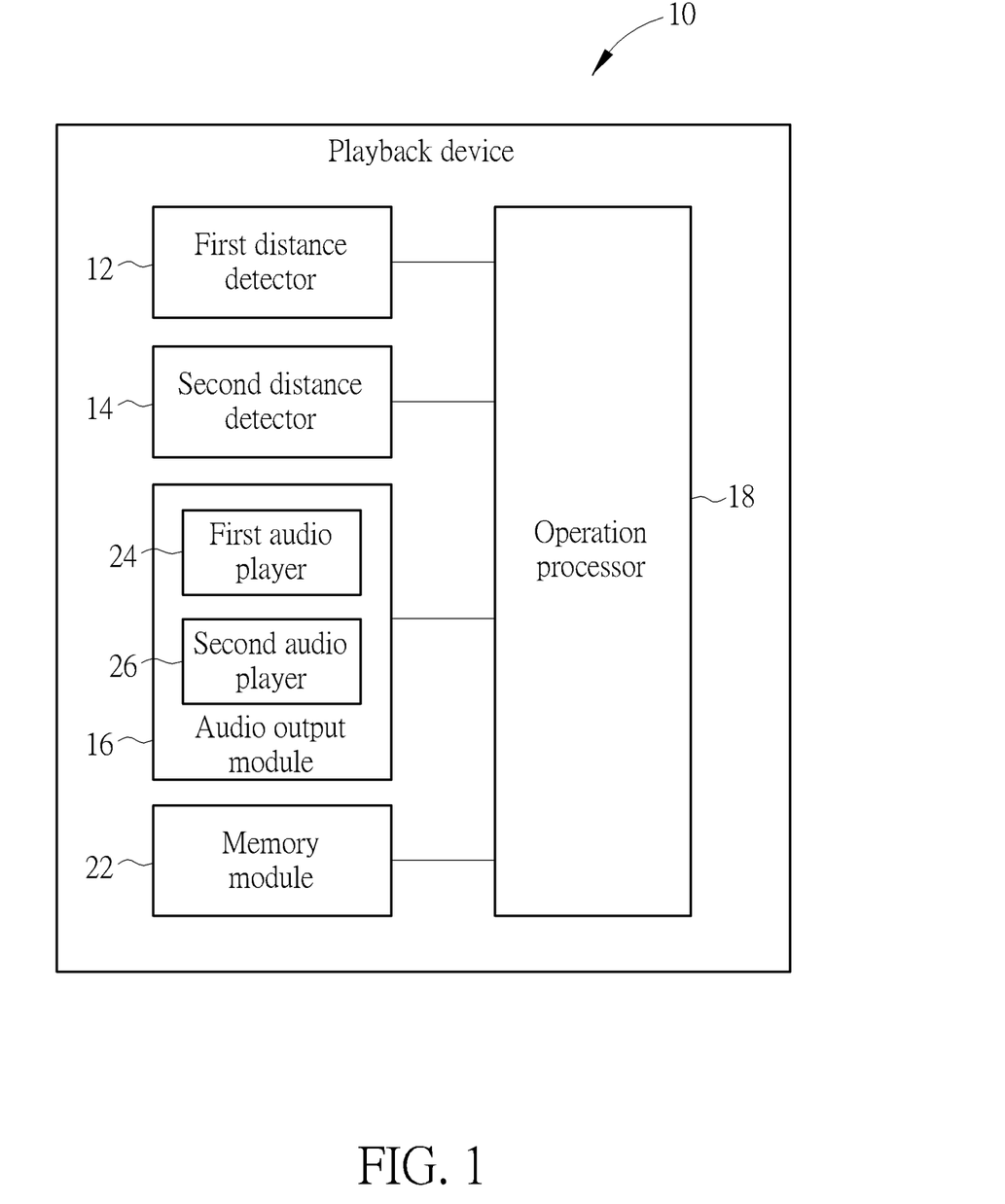
FIG. 1 is a functional block diagram of a playback device according to a first embodiment of the present invention.
Figure 2:
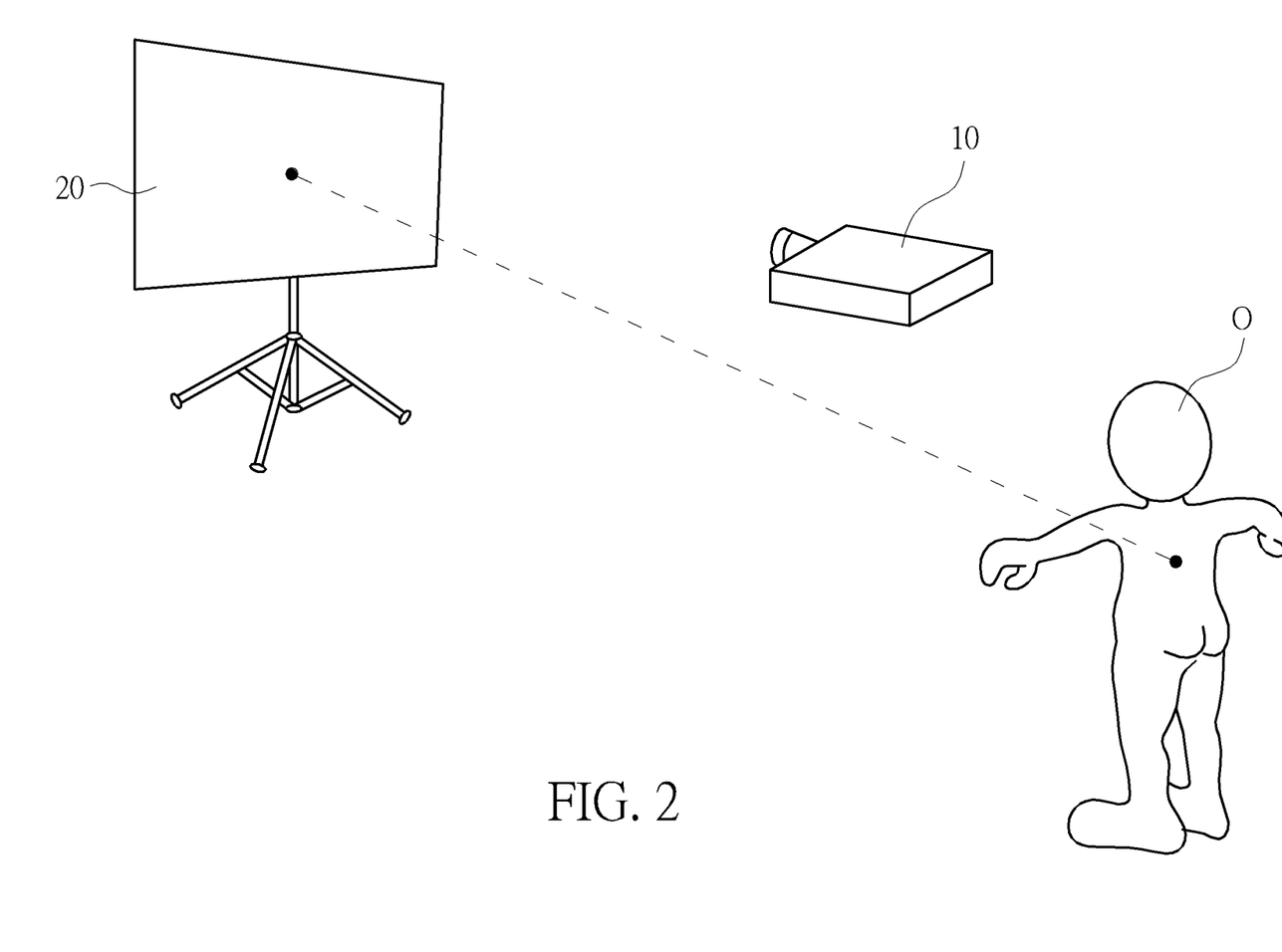
FIG. 2 is an application diagram of the playback device according to the first embodiment of the present invention.
Figure 3:
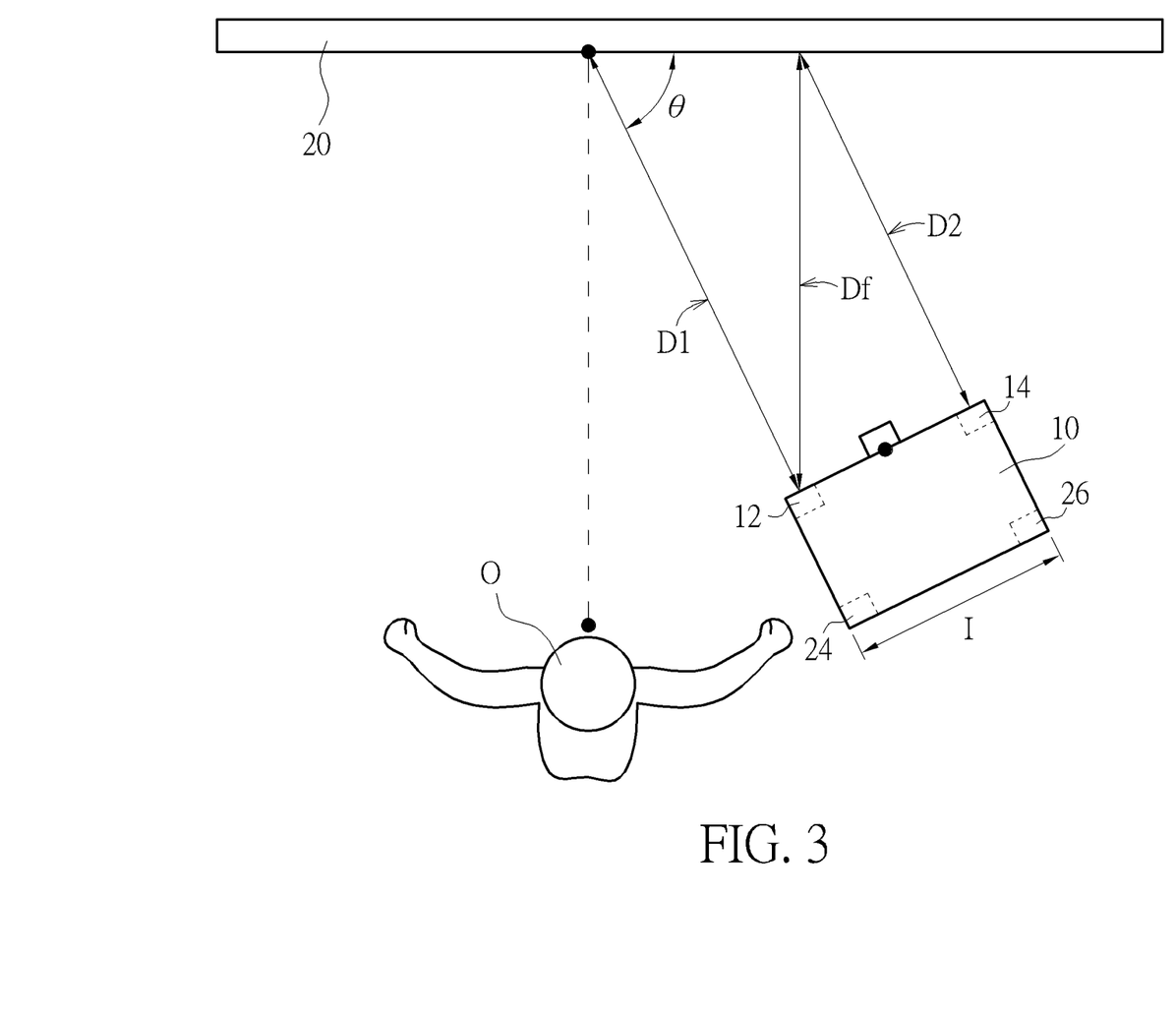
FIG. 3 is a top view of the playback device according to the first embodiment of the present invention.

Please refer to FIG. 1 to FIG. 3. FIG. 1 is a functional block diagram of a playback device 10 according to a first embodiment of the present invention. FIG. 2 is an application diagram of the playback device 10 according to the first embodiment of the present invention. FIG. 3 is a top view of the playback device 10 according to the first embodiment of the present invention. The playback device 10 can at least include a first distance detector 12, a second distance detector 14, an audio output module 16 and an operation processor 18. The playback device 10 can be a projector, or any entertainment apparatus used to play the video file. As an example of the projector, a target object O (which means the user) can preferably stand right before a projection area of the projector, and position of the target object O depends on actual demand; for example, the target object O may stand on a left side or a right side before the projection area. The projection area may be a wall or a projection screen 20. The playback device 10 can be disposed on the lateral side before the projection screen 20 due to environmental restriction, and used to project the playback image or the playback video onto the projection screen 20. The sight of the target object O is not blocked by the playback device 10.

The first distance detector 12 and the second distance detector 14 can be the TOF (Time of Flight) detectors, or other detectors with similar distance detecting functions. The playback device 10 can apply horizontal and vertical calibration to the playback image via detection results of the first distance detector 12 and the second distance detector 14, so that the target object O can see the playback image with the square form. Besides, the present invention can further execute audio compensation of the audio output module 16 in accordance with the detection results of the first distance detector 12 and the second distance detector 14, and therefore the target object O can receive the channel-balanced audio effect.

As shown in FIG. 3, the first distance detector 12 and the second distance detector 14 can be respectively disposed on different position of a front end of the playback device 10. Actual position of the first distance detector 12 and the second distance detector 14 is not limited to the embodiment shown in FIG. 3, and a detailed description of other variation is omitted herein for simplicity. The first distance detector 12 can acquire a first distance D1 of the playback device 10 relative to the projection screen 20. The second distance detector 14 can acquire a second distance D2 of the playback device 10 relative to the projection screen 20. An interval I between the first distance detector 12 and the second distance detector 14 can be a known parameter. The playback device 10 can transform the first distance D1, the second distance D2 and the interval I into a projection distance Df and a relative angle θ of the playback device 10 relative to the projection screen 20 via trigonometric functions.

If the first distance detector 12 and the second distance detector 14 are the TOF detectors, light emitters of the first distance detector 12 and the second distance detector 14 can emit laser to project onto the tested object (such as the projection screen 20), and light receivers of the first distance detector 12 and the second distance detector 14 can receive scatter light reflected from the tested object. The operation processor 18 can compute two-way flight time of photons, so as to acquire the distances and the angles of the first distance detector 12 and the second distance detector 14 relative to the tested object. The TOF detector may be the DTOF (Direct Time of Flight) detector, which can measure time difference Δt between an emitting point of time of the light emitter and a receiving point of time of the light receiver. The speed of light is the known value, so that the distance d between the first distance detector 12 and the second distance detector 14 and the projection screen 20 can be computed by formula 1. The distance d can be interpreted as the first distance D1 of the first distance detector 12 relative to the projection screen 20, or the second distance D2 of the second distance detector 14 relative to the projection screen 20.

$$d = \frac{c * \Delta t}{2} \qquad \text{Formula 1}$$

Besides, the TOF detector can further analyze phase difference between the emitted laser of the light emitter and the scatter light of the light receiver to compute the distance. For example, the light emitter of the first distance detector 12 (or the second distance detector 14) can emit the laser with modulation frequency fm. The scattering light received by the light receiver of the first distance detector 12 (or the second distance detector 14) can have another modulation frequency fm', and the phase difference φ exists between the modulation frequency fm and the modulation frequency fm' and can be computed by quadrature signal processing technology. The speed of light is the known value, so that the distance d of the first distance detector 12 and the second distance detector 14 relative to the projection screen 20 can be computed by formula 2. The distance d can be interpreted as the first distance D1 of the first distance detector 12 relative to the projection screen 20, or the second distance D2 of the second distance detector 14 relative to the projection screen 20, and then Pythagorean theorem can be applied to compute the projection distance Df, such as formula 3.

$$d = \frac{c}{4\pi * fm} * \varphi \qquad \text{Formula 2}$$

$$Df = \sqrt{d^2 - (I/2)^2} \qquad \text{Formula 3}$$

In the present invention, the projection distance Df can be defined as a distance between a predefined reference point of the playback device 10 and a center of the projection screen 20. The relative angle θ can be defined as an angle between a central line of the playback device 10 and a front surface of the projection screen 20. The predefined reference point can be a center point or any other computed point of the first distance detector 12 and the second distance detector 14. Definition of the projection distance Df and the relative angle θ is not limited to the above-mentioned embodiment, and depends on the design demand.

The playback device 10 can further optionally include a memory module 22 used to store an installed direction parameter and an audio setting table of the playback device 10. The installed direction parameter can indicate arrangement of the playback device 10 relative to the projection screen 20; for example, a bottom of the playback device 10 may be put on a supporting surface, or the playback device 10 is overturned and a top of the playback device 10 may be put on the supporting surface. The audio setting table can include several setting parameters of the audio output module 16, such as a delay time and a play volume of the audio signal, or other parameters that affect listening effect. A number of the installed direction parameter can correspond to a number of the audio setting table. For example, the playback device 10 may preferably have two installed direction parameters, such as a positive installation parameter and a negative installation parameter; the playback device 10 can include two audio setting tables accordingly, respectively relevant to the positive installation parameter and the negative installation parameter. The number and parameter content of the installed direction parameter and the audio setting table are not limited to the above-mentioned embodiment, and depend on the design demand.

The audio output module 16 can at least include a first audio player 24 and a second audio player 26 respectively disposed on different corners of the playback device 10, such as the left rear corner and the right rear corner shown in FIG. 3; actual position of the first audio player 24 and the second audio player 26 is not limited to the above-mentioned embodiment. The audio setting table can store several setting parameters of the first audio player 24 and the second audio player 26 in a variety of environmental conditions. For example, the audio setting table may store the delay time and the play volume in a variety of the projection distances Df and the various relative angle θ, as illustrated in the following table. It should be mentioned that the following audio setting table can correspond to one of the positive installation parameter and the negative installation parameter, and data in the following audio setting table may be varied and depend on the actual application.

In the following audio setting table, the playback device 10 is located on the right side of the target object O when the relative angle θ is smaller than ninety degrees, and the audio output time of the first audio player 24 on the left side of the playback device 10 can be later than the audio output time of the second audio player 26 on the right side of the playback device 10; and the delay time can be varied in accordance with degrees of the relative angle θ. Besides, the audio decibel of the first audio player 24 on the left side of the playback device 10 can be greater than the audio decibel of the second audio player 26 on the right side of the playback device 10, and decibel difference between the first audio player 24 and the second audio player 26 can be varied in accordance with the degrees of the relative angle θ. Mutual relation between the first audio player 24 and the second audio player 26 in the delay time, the play volume or other setting parameters are not limited to the following audio setting table, and can be adjusted in accordance with the user's habit or component property of the playback device 10.

| Audio Setting Table | | |
|---|---|---|
| | first audio player 24 | second audio player 26 |
| relative angle θ | delay time | |
| >90 degree | | 2 millisecond |
| >100 degree | | 4 millisecond |
| >110 degree | | 6 millisecond |
| >120 degree | | 8 millisecond |
| >130 degree | | 10 millisecond |
| >140 degree | | 12 millisecond |
| >80 degree | 2 millisecond | |
| >70 degree | 4 millisecond | |
| >60 degree | 6 millisecond | |
| >50 degree | 8 millisecond | |
| >40 degree | 10 millisecond | |
| >30 degree | 12 millisecond | |
| projection distance Df | play volume | |
| 1 meter | | +1 decibel |
| 2 meter | | +2 decibel |
| 3 meter | | +3 decibel |
| 4 meter | | +4 decibel |
| 5 meter | | +5 decibel |
| 6 meter | | +6 decibel |
| 1 meter | +1 decibel | |
| 2 meter | +2 decibel | |
| 3 meter | +3 decibel | |
| 4 meter | +4 decibel | |
| 5 meter | +5 decibel | |
| 6 meter | +6 decibel | |

Figure 4:
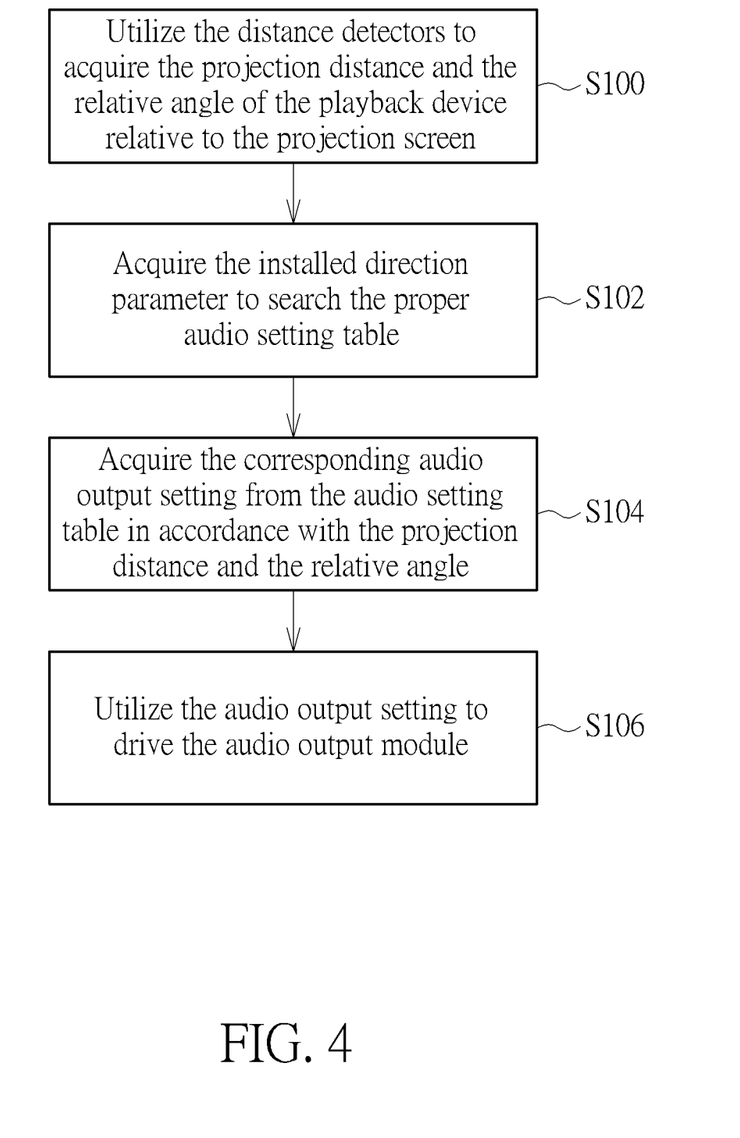
FIG. 4 is a flow chart of an audio compensation method according to a first embodiment of the present invention.

Please refer to FIG. 4. FIG. 4 is a flow chart of an audio compensation method according to a first embodiment of the present invention. The audio compensation method illustrated in FIG. 4 is suitable for the playback device 10 shown in FIG. 1 to FIG. 3. The operation processor 18 can be electrically connected to the first distance detector 12, the second distance detector 14, the audio output module 16 and the memory module 22. The operation processor 18 can execute and apply the audio compensation method for the playback device 10. First, step S100 can be executed to utilize the first distance detector 12 and the second distance detector 14 to acquire the projection distance Df and the relative angle θ of the playback device 10 relative to the projection screen 20. As mentioned above, the present invention can transform the first distance D1, the second distance D2 and the interval I into the projection distance Df and the relative angle θ by the trigonometric functions.

Then, steps S102, S104 and S106 can be executed to acquire the installed direction parameter and search the proper audio setting table from the memory module 22, and acquire the corresponding audio output setting from the audio setting table in accordance with the projection distance Df and the relative angle θ, and then utilize the audio output setting to drive the first audio player 24 and the second audio player 26 of the audio output module 16. For example, if step S100 acquires the projection distance Df equal to one meter and the relative angle θ ranged between eighty and ninety degrees, the audio compensation method of the present invention can apply the audio output setting (which delays two milliseconds and increases one decibel) for the first audio player 24, and keep the second audio player 26 in the original audio output setting, so as to provide an audio field automatic compensation effect, and further to effectively avoid audio effects heard by the target object O from reduction due to unbalanced audio.

Figure 5:
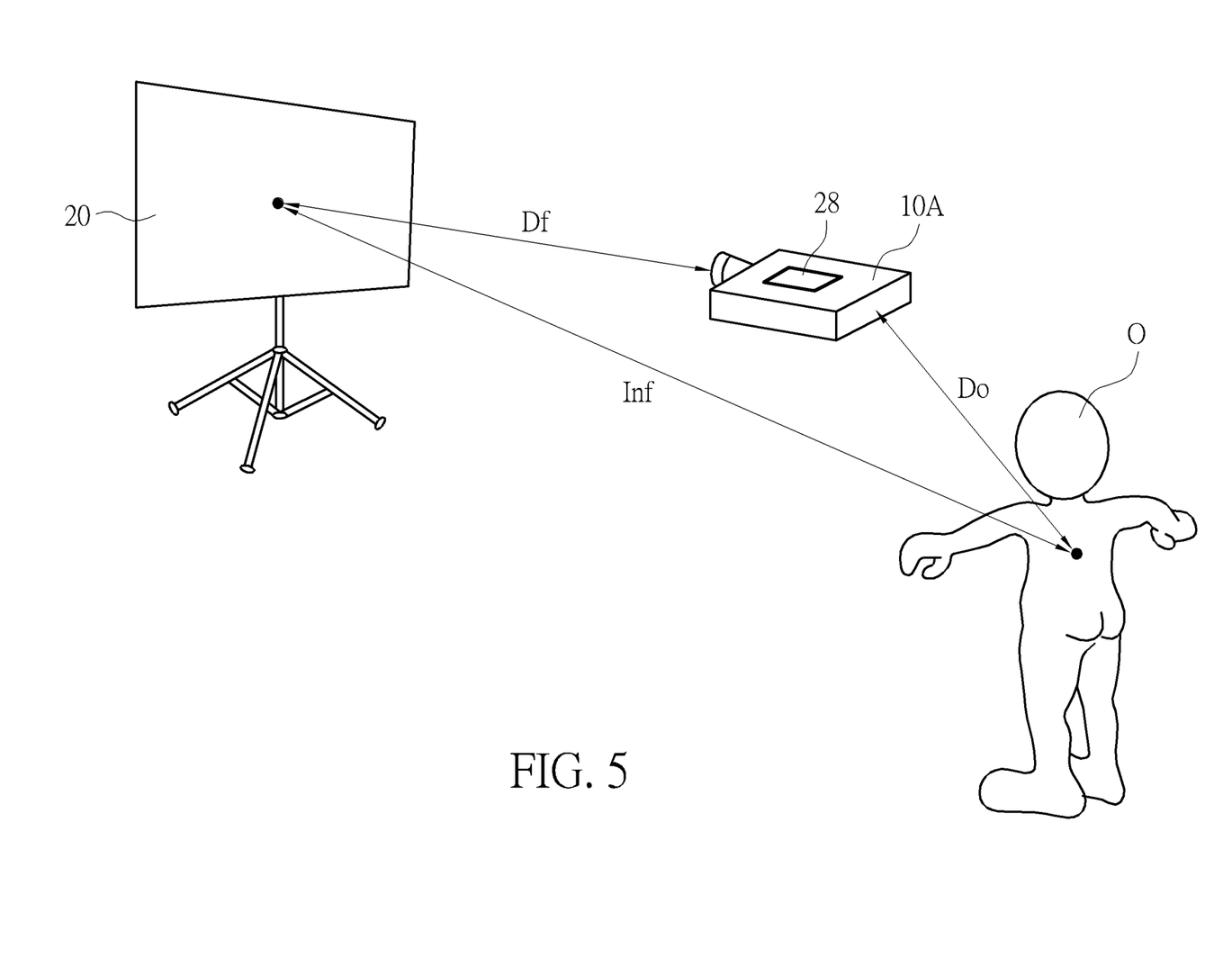
FIG. 5 is an application diagram of the playback device according to a second embodiment of the present invention.

Please refer to FIG. 5. FIG. 5 is an application diagram of the playback device 10A according to a second embodiment of the present invention. In the second embodiment, elements having the same numerals as ones of the first embodiment have the same structures and functions, and the detailed description is omitted herein for simplicity. The playback device 10A can further include an input interface 28 electrically connected to the operation processor 18. The input interface 28 can be a touch screen, an operation panel with keyswitches, or an interface with data input functions. An orientation datum of the target object O relative to the playback device 10A can be manually input by the input interface 28, and position of the target object O can be defined as a boundary of the predefined receivable range. The audio compensation method of the present invention can read input information Inf (such as the orientation datum about the distance and/or the angle of the target object O relative to the projection screen 20) from the input interface 28, and the input information Inf, the projection distance Df and the relative angle θ can be used to compute a receiving distance Do between the target object O and the playback device 10A. The audio output setting of the audio setting table can be calibrated via the receiving distance Do, and the audio output module 16 can be driven by the calibrated audio output setting.

Therefore, the playback device 10A of the second embodiment can automatically determine the orientation datum of the playback device 10A relative to the projection screen 20, and further can compute the orientation datum of the playback device 10A relative to the target object O, so as to adjust the delay time and the play volume of the first audio player 24 and the second audio player 26 of the audio output module 16 in accordance with the orientation datum, and to ensure that the target object O can get preferred audio experience wherever it's located.

Figure 6:
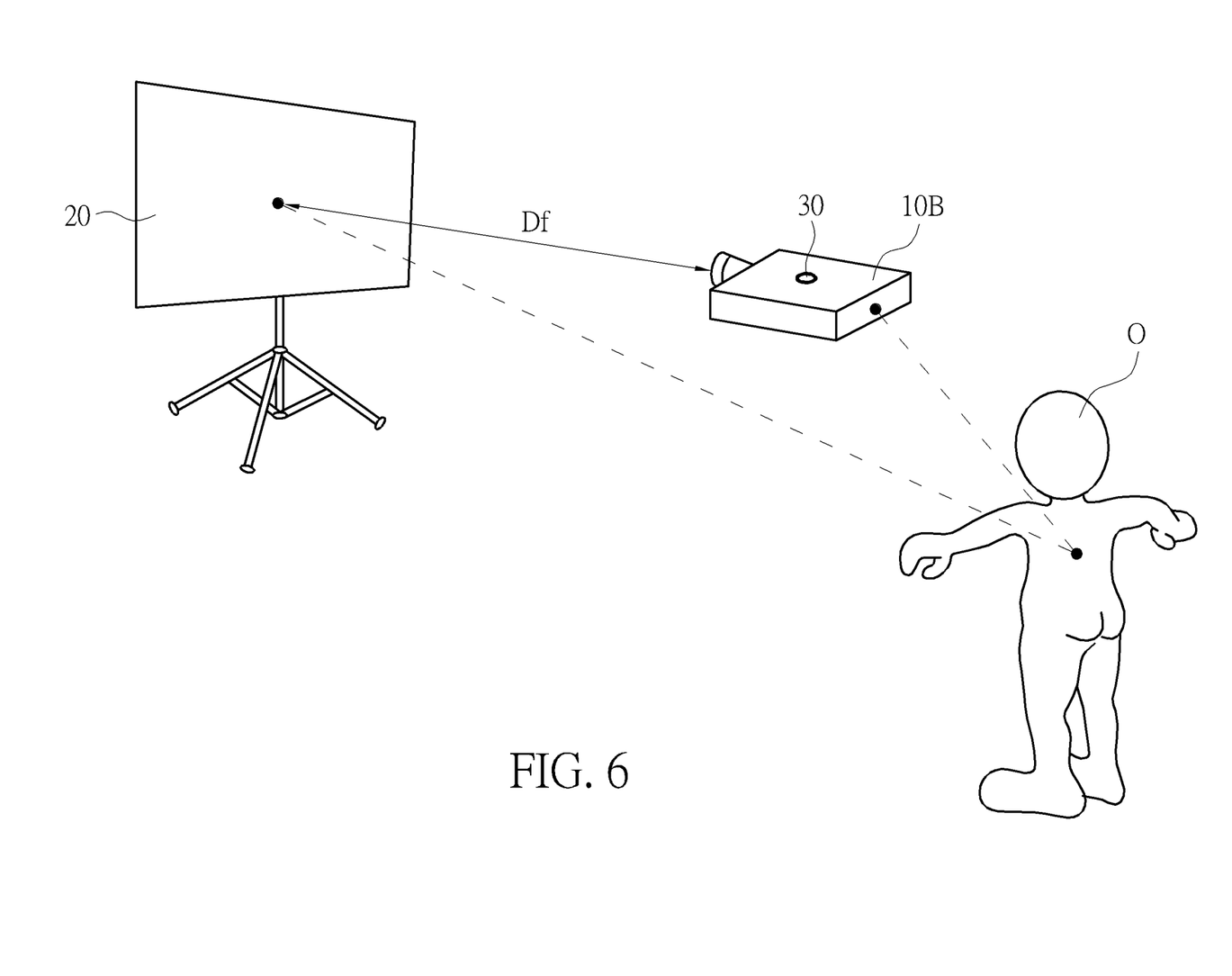
FIG. 6 is an application diagram of the playback device according to a third embodiment of the present invention.

Please refer to FIG. 6. FIG. 6 is an application diagram of the playback device 10B according to a third embodiment of the present invention. In the third embodiment, elements having the same numerals as ones of the foresaid embodiments have the same structures and functions, and the detailed description is omitted herein for simplicity. The playback device 10B can further include an object detector 30 electrically connected to the operation processor 18. The object detector 30 can be any type of the distance detector used to detect the relative distance and the relative angle of the target object O located around the playback device 10B. The audio compensation method of the present invention can read a detection result of the object detector 30 to directly acquire the orientation data, such as the distance and/or the angle, of the playback device 10B relative to the target object O, and calibrate the audio output setting of the audio setting table via the orientation data, so as to drive the audio output module 16 by the calibrated audio output setting.

In conclusion, the audio compensation method and the playback device of the present invention can utilize the distance detector to acquire the relative distance and the degrees of the playback device relative to the projection screen, and to compute an arranged orientation of the playback device; if the predefined target object stands right before the projection screen, the arranged orientation of the playback device and the angle and distance parameters of the playback device relative to the projection screen can be analyzed to compute the setting parameters of the audio players of the audio output module, for an aim of the automatic audio field compensation. Moreover, the target object may freely move before the projection screen, so the present invention can further utilize the input interface or the object detector to acquire position of the target object, and immediately adjust the setting parameters of the audio players of the audio output module in accordance with the orientation data of the playback device relative to the projection screen and the target object; it is to say, if the target object moves before the projection screen, the audio compensation method and the playback device of the present invention can detect a moving track or current position of the target object to accordingly calibrate the output effects of the audio output module, so as to ensure the target object can have the preferred audio experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An audio compensation method applied to a playback device, the playback device having a first distance detector, a second distance detector, an audio output module and an operation processor, the audio compensation method comprising:

the operation processor utilizing the first distance detector and the second distance detector to acquire a projection distance and a relative angle of the playback device relative to a projection screen;

the operation processor acquiring an installed direction parameter of the playback device;

the operation processor searching at least one audio output setting from an audio setting table in accordance with the projection distance and the relative angle and the installed direction parameter; and the operation processor utilizing the audio output setting to drive the audio output module.

2. The audio compensation method of claim 1, wherein the audio output module comprises a first audio player and a second audio player respectively disposed on different corners of the playback device, the audio compensation method further comprises:

the operation processor driving the first audio player and the second audio player to respectively output a related audio signal via different audio parameters in accordance with the audio output setting.

3. The audio compensation method of claim 2, wherein the foresaid audio parameters are a delay time and/or a play volume of the audio signal.

4. The audio compensation method of claim 1, wherein the operation processor utilizes the first distance detector and the second distance detector to acquire the projection distance and the relative angle of the playback device relative to the projection screen comprises:

the operation processor acquiring a first distance of the first distance detector relative to the projection screen, and a second distance of the second distance detector relative to the projection screen;

the operation processor acquiring an interval between the first distance detector and the second distance detector; and the operation processor transforming the first distance, the second distance and the interval into the projection distance and the relative angle via trigonometric functions.

5. The audio compensation method of claim 1, wherein the playback device further comprises an input interface, the audio compensation method further comprises:

the operation processor acquiring input information from the input interface;

the operation processor computing a receiving distance of the playback device relative to a predefined receivable range in accordance with the input information, the projection distance and the relative angle; and the operation processor calibrating the audio output setting via the receiving distance and further utilizing the calibrated audio output setting to drive the audio output module.

6. The audio compensation method of claim 5, wherein the input information is at least one of a distance and an angle of the predefined receivable range relative to the projection screen, and the at least one of the distance and the angle is manually input.

7. The audio compensation method of claim 1, wherein the playback device further comprises an object detector adapted to detect a relative distance and a relative angle of a target object located around the playback device, the audio compensation method comprises:

the operation processor acquiring the relative distance and the relative angle detected by the object detector; and the operation processor calibrating the audio output setting via the relative distance and the relative angle, and further utilizing the calibrated audio output setting to drive the audio output module.

8. The audio compensation method of claim 1, wherein the playback device further comprises a memory module adapted to store a plurality of audio setting tables, the audio compensation method comprises:

the operation processor searching the audio setting table relevant to the installed direction parameter from the plurality of audio setting tables, so as to acquire the corresponding audio output setting in the searched audio setting table.

9. A playback device with an audio compensation function and having an installed direction parameter and an audio setting table, the playback device comprising:

a first distance detector adapted to acquire a first distance of the playback device relative to a projection screen;

a second distance detector adapted to acquire a second distance of the playback device relative to the projection screen;

an audio output module; and an operation processor electrically connected to the first distance detector, the second distance detector and the audio output module, the operation processor being adapted to analyze the first distance and the second distance to acquire a projection distance and a relative angle of the playback device relative to the projection screen, and search at least one corresponding audio output setting from the audio setting table in accordance with the installed direction parameter, the projection distance and the relative angle, so as to drive the audio output module by the audio output setting.

10. The playback device of claim 9, wherein the audio output module comprises a first audio player and a second audio player respectively disposed on different corners of the playback device, the operation processor drives the first audio player and the second audio player to respectively output a related audio signal via different audio parameters in accordance with the audio output setting.

11. The playback device of claim 10, wherein the foresaid audio parameters are a delay time and/or a play volume of the audio signal.

12. The playback device of claim 9, wherein the operation processor transforms an interval between the first distance detector and the second distance detector, the first distance and the second distance into the projection distance and the relative angle via trigonometric functions.

13. The playback device of claim 9, wherein the playback device further comprises an input interface electrically connected to the operation processor, the operation processor acquires input information from the input interface, computes a receiving distance of the playback device relative to a predefined receivable range in accordance with the input information, the projection distance and the relative angle, and calibrates the audio output setting via the receiving distance and then utilizes the calibrated audio output setting to drive the audio output module.

14. The playback device of claim 13, wherein the input interface is an operation panel or a touch screen of the playback device, the input information is at least one of a distance and an angle of the predefined receivable range relative to the projection screen, and the at least one of the distance and the angle is manually input.

15. The playback device of claim 9, wherein the playback device further comprises an object detector electrically connected to the operation processor, the operation processor utilizes the object detector to detect a relative distance and a relative angle of a target object located around the playback device, and calibrates the audio output setting via the relative distance and the relative angle and then utilizes the calibrated audio output setting to drive the audio output module.

16. The playback device of claim 9, wherein the playback device further comprises a memory module electrically connected to the operation processor and adapted to store a plurality of audio setting tables, the operation processor searches the audio setting table relevant to the installed direction parameter from the plurality of audio setting tables, so as to acquire the corresponding audio output setting in the searched audio setting table.

* * * * *